United States Patent
Schultz et al.

(10) Patent No.: US 12,552,459 B2
(45) Date of Patent: Feb. 17, 2026

(54) TRAILER TABLE STORAGE COMPARTMENT

(71) Applicant: Lippert Components, Inc., Elkhart, IN (US)

(72) Inventors: Timothy D. Schultz, Cassopolis, MI (US); Jason Woodford, Soldotna, AK (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 428 days.

(21) Appl. No.: 18/077,595

(22) Filed: Dec. 8, 2022

(65) Prior Publication Data

US 2023/0174160 A1    Jun. 8, 2023

Related U.S. Application Data

(60) Provisional application No. 63/287,368, filed on Dec. 8, 2021.

(51) Int. Cl.
*B62D 21/20* (2006.01)
*B60N 3/00* (2006.01)
*B60R 9/02* (2006.01)
*B62D 63/08* (2006.01)

(52) U.S. Cl.
CPC ............. *B62D 21/20* (2013.01); *B60N 3/001* (2013.01); *B60R 9/02* (2013.01); *B62D 63/08* (2013.01)

(58) Field of Classification Search
CPC ... B60P 3/32; B60P 3/36; B62D 21/20; B62D 63/06; B62D 63/061; B62D 63/08; B60R 9/02

See application file for complete search history.

(56) References Cited

U.S. PATENT DOCUMENTS

| | | | |
|---|---|---|---|
| 3,756,622 A | | 9/1973 | Pyle et al. |
| 4,869,030 A | * | 9/1989 | Clark .................. B60P 3/32 182/88 |
| 4,883,306 A | * | 11/1989 | Stucky ................. B60P 3/32 52/143 |
| 4,915,437 A | * | 4/1990 | Cherry ................ B60R 11/06 211/151 |
| 5,125,710 A | * | 6/1992 | Gianelo ............... B60R 9/02 224/538 |
| 5,860,786 A | | 1/1999 | Aubrecht |
| 6,145,447 A | | 11/2000 | Henderson |

(Continued)

FOREIGN PATENT DOCUMENTS

| | | |
|---|---|---|
| CN | 105600471 B | 10/2017 |
| CN | 210363552 U | 4/2020 |

OTHER PUBLICATIONS

Lippert 125460 RV Under Chassis Storage Unit, https://www.amazon.com/Lippert-125460-Under-Chassis-Storage/dp/B00JMMFEJE, website pages, printed out on Dec. 7, 2022 (origination date unknown), 7 pp.

*Primary Examiner* — Gregory A Blankenship
(74) *Attorney, Agent, or Firm* — NIXON & VANDERHYE P.C.

(57) ABSTRACT

A trailer chassis includes a first frame beam, a second frame beam parallel to and spaced from the first frame beam, and a plurality of cross members connected between the first frame beam and the second frame beam. A storage compartment for a folding table or the like is cooperable with the first and second frame beams.

19 Claims, 4 Drawing Sheets

(56) References Cited

U.S. PATENT DOCUMENTS

| | | | |
|---|---|---|---|
| 6,263,867 B1* | 7/2001 | Skelton | B60R 9/02 248/240.1 |
| 6,742,979 B1* | 6/2004 | Salazar | B60R 9/02 414/522 |
| 6,869,092 B1* | 3/2005 | Henn | B60R 3/02 280/166 |
| 6,971,707 B1* | 12/2005 | Mullan | B60P 3/39 296/159 |
| 6,976,721 B2* | 12/2005 | Rasmussen | B60P 3/34 296/26.14 |
| 8,020,911 B2 | 9/2011 | McKelvey | |
| 2002/0063422 A1* | 5/2002 | Few | B60G 21/026 280/789 |
| 2003/0155748 A1* | 8/2003 | Picard | B62D 21/20 280/656 |
| 2005/0140159 A1* | 6/2005 | Barber | B60P 3/14 296/37.6 |
| 2007/0007784 A1* | 1/2007 | Doyle | B60R 5/041 296/37.1 |
| 2008/0061543 A1* | 3/2008 | Gardner | B60R 5/041 280/769 |
| 2012/0153667 A1* | 6/2012 | Raber | B60P 3/34 296/1.07 |
| 2014/0151141 A1* | 6/2014 | Ehl | B62D 29/041 296/193.07 |
| 2016/0193952 A1* | 7/2016 | Hynd | B62D 63/061 280/414.1 |
| 2020/0171996 A1 | 6/2020 | Chevalier et al. | |
| 2022/0087883 A1* | 3/2022 | Cha | B66F 3/12 |
| 2022/0242325 A1* | 8/2022 | Clements | B60R 9/00 |
| 2023/0174160 A1* | 6/2023 | Schultz | B62D 63/08 296/203.01 |
| 2023/0271544 A1* | 8/2023 | Elsner | B60P 3/34 296/168 |

\* cited by examiner

TRAILER TABLE STORAGE COMPARTMENT

CROSS-REFERENCES TO RELATED APPLICATIONS

This application claims the benefit of U.S. Provisional Patent Application No. 63/287,368, filed Dec. 8, 2021, the entire content of which is herein incorporated by reference.

STATEMENT REGARDING FEDERALLY SPONSORED RESEARCH OR DEVELOPMENT (NOT APPLICABLE)

BACKGROUND

The invention relates to trailers and exterior storage and, more particularly, to a trailer chassis incorporating a storage compartment for a folding table or the like.

Storage space is limited in recreational vehicles (RVs) and towed trailers. Under-chassis storage bins are known, but existing assemblies can be difficult to install and can be expensive.

A folding table is a staple as an outdoor accessory for an RV or towed trailer. With limited storage space, however, it can be burdensome to carry and store a folded table.

SUMMARY

It would thus be desirable to provide a simplified and low cost storage compartment that is cooperable with the beams of the trailer chassis to provide added storage for a folding table or the like. In some embodiments, a storage compartment is mounted to the frame beams of a trailer chassis for storing an item such as a standard folding table or the like. The storage compartment may be accessible below the skirting of the trailer. In some embodiments, the storage compartment is made of two spaced apart C-channels or C-shaped beams that are welded between the frame beams of the trailer chassis. When configured to store a standard folding table, the C-channels are spaced to receive both lengthwise sides of the table. Of course, the channels could be modified to accommodate other tables or accessories. A cover may be removably installed to contain the stored article in the storage compartment during travel and to protect it from outside elements.

In an exemplary embodiment, a trailer chassis includes a first frame beam, a second frame beam parallel to and spaced from the first frame beam, a plurality of cross members connected between the first frame beam and the second frame beam, and a storage compartment cooperable with the first and second frame beams.

The storage compartment may include a first C-shaped beam connected to and extending between the first and second frame beams and a second C-shaped beam connected to and extending between the first and second frame beams and spaced from the first C-shaped beam. Open sides of the first and second C-shaped beams may be disposed facing each other. The first and second C-shaped beams may be welded to the first and second frame beams. The first frame beam may include a first storage compartment opening, and the first and second C-shaped beams may be secured in the storage compartment opening. The second frame beam may include a second storage compartment opening. A stored article may be securable in openings of the first and second C-shaped beams, and the trailer chassis may further include a cover securable at an end of the stored article. The stored article may be a folding table.

The first and second frame beams may be I-beams including a head, a body and foot. The storage compartment may be positioned between the head and the foot of the I-beams and through the body of at least one of the first and second frame beams.

In another exemplary embodiment, a trailer chassis includes a first frame beam, a second frame beam parallel to and spaced from the first frame beam, a plurality of cross members connected between the first frame beam and the second frame beam, and a storage compartment cooperable with the first and second frame beams. The first frame beam includes a storage compartment opening, wherein the storage compartment has a first C-shaped beam connected to and extending between the first and second frame beams and a second C-shaped beam connected to and extending between the first and second frame beams and spaced from the first C-shaped beam. Additionally, open sides of the first and second C-shaped beams are disposed facing each other.

BRIEF DESCRIPTION OF THE DRAWINGS

These and other aspects and advantages will be described in detail with reference to the accompanying drawings, in which.

DETAILED DESCRIPTION

Figure 1:
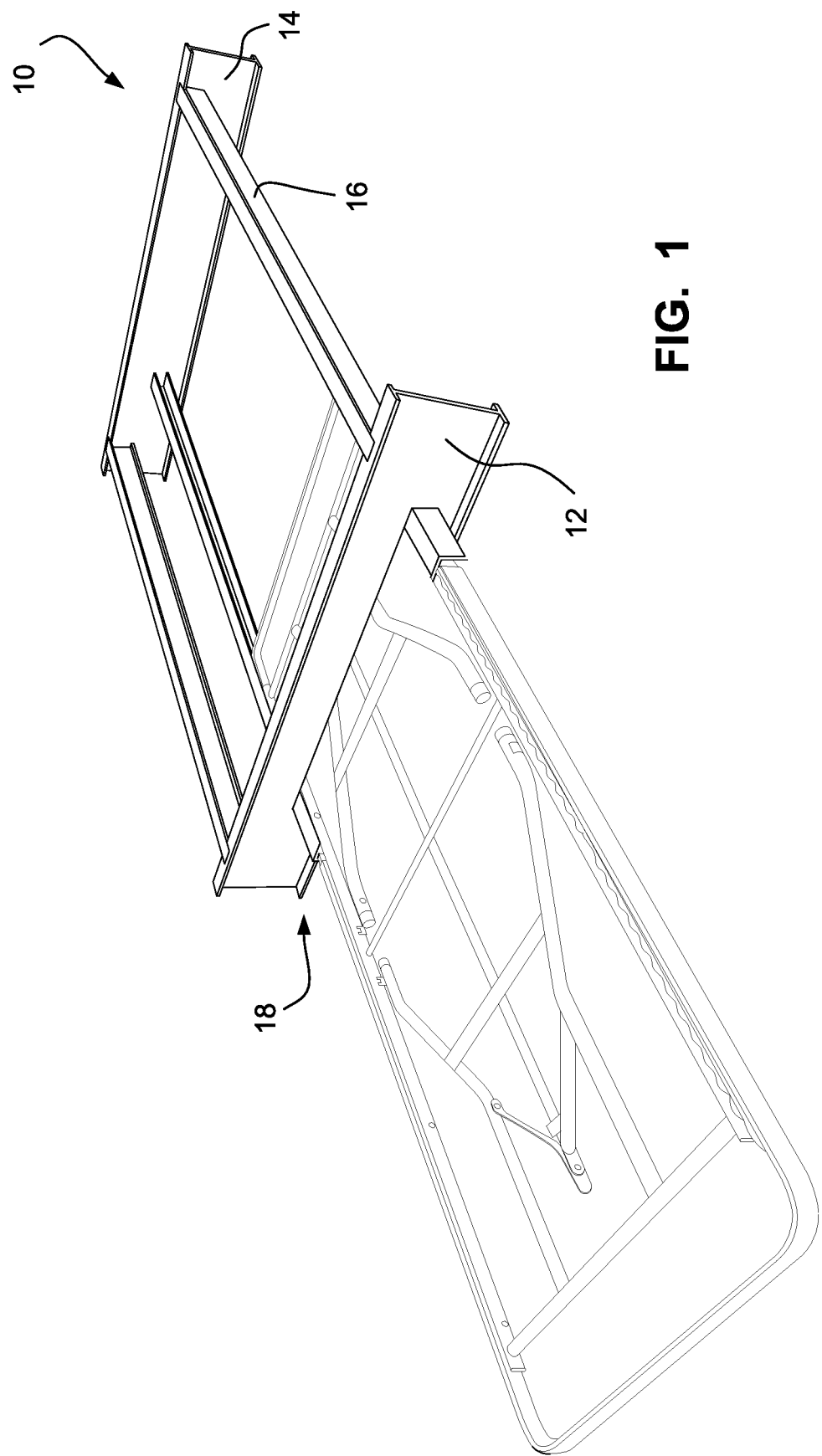
FIGS. 1 and 2 are perspective views of the trailer chassis with a storage compartment according to the described embodiments.
Figure 2:
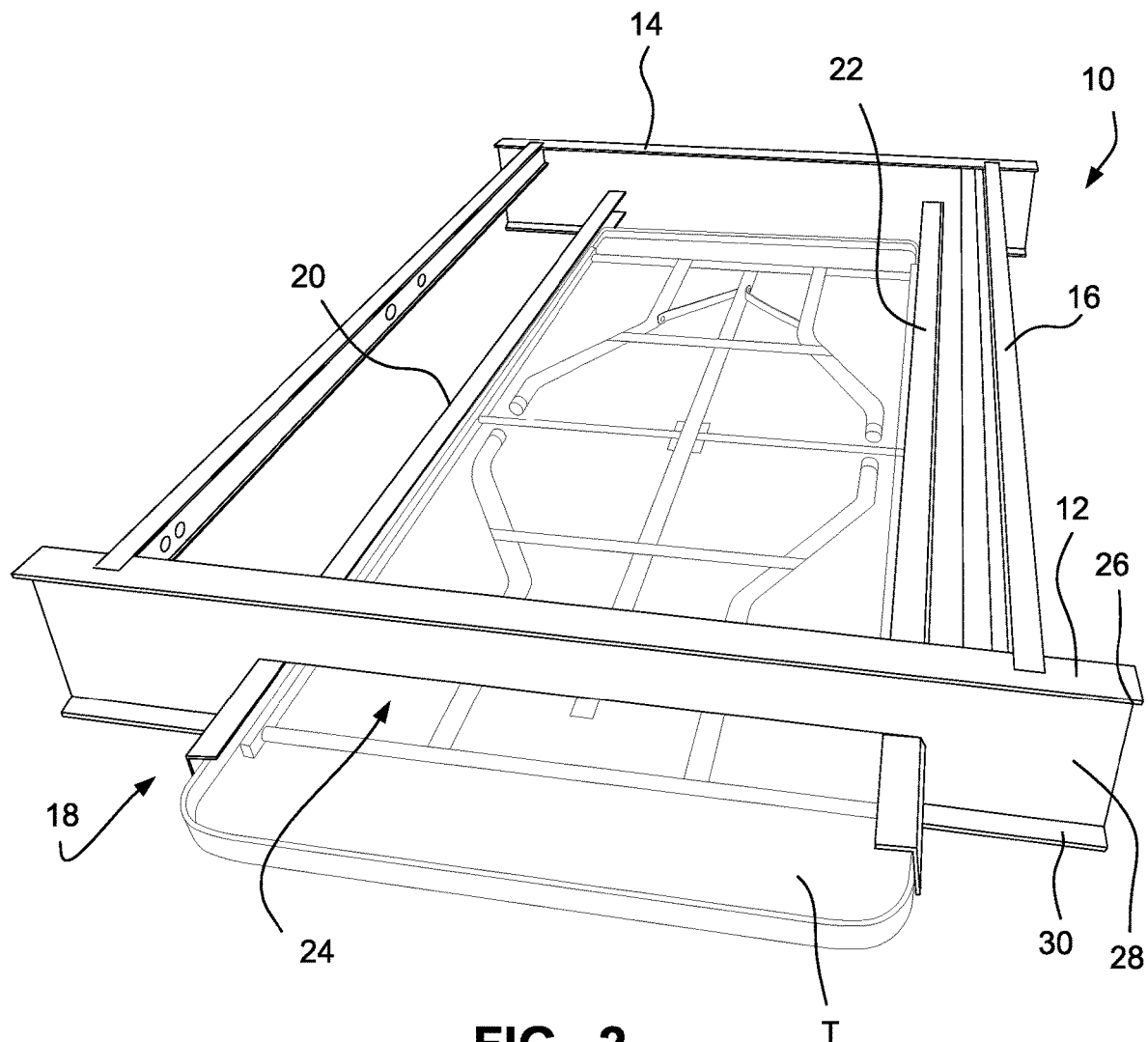

A trailer chassis typically includes parallel beams extending lengthwise along the RV or towed vehicle and a plurality of cross members connected between the parallel frame beams. FIGS. 1 and 2 show a section of a trailer chassis 10 including a first frame beam 12, a second frame beam 14 parallel to and spaced from the first frame beam 12, and a plurality of cross members 16 connected between the first frame beam 12 and the second frame beam 14. A storage compartment 18 is cooperable with the first and second frame beams 12, 14.

The storage compartment 18 includes a first C-shaped beam 20 connected to and extending between the first and second frame beams 12, 14 and a second C-shaped beam 22 similarly connected to and extending between the first and second frame beams 12, 14 and spaced from the first C-shaped beam 20. In some embodiments, the first and second C-shaped beams 20, 22 are welded to the first and second frame beams 12, 14. Open sides of the first and second C-shaped beams 20, 22 are disposed facing each other. The C-shaped beams 20, 22 may add additional structure to the chassis and could allow for the removal of one or more cross members 16, in some embodiments.

A storage compartment opening 24 in the form of a cutout may be provided in the first frame beam 12. The storage compartment opening 24 provides access to the table T or other stored item through the first frame beam 12. In some embodiments, both of the first and second frame beams 12, 14 include a storage compartment opening 24 for accessing the table T or other stored item from either side of the trailer.

As shown, the C-shaped beams 20, 22 may be spaced to receive both lengthwise sides of a standard folding table T. As would be appreciated to those of ordinary skill in the art, the C-shaped beams 20, 22 could be modified to accommodate other tables or accessories. In use, one end of the table T is aligned with the first and second C-shaped beams 20, 22, and the table T can slide into the compartment for storage.

An exemplary trailer chassis utilizes I-beams for the first and second frame beams 12, 14. The I-beams include a head 26, body 28 and foot 30. In this context, in some embodiments, the storage compartment 18 is positioned between the head 26 and the foot 30 of the I-beams. The first and second C-shaped beams 20, 22 may extend through the body 28 of at least one of the first and second frame beams 12, 14. In such an embodiment, the extended first and second C-shaped beams 20, 22 may act as a lead-in or guide for inserting the table or other item into the storage compartment opening. The first and second C-shaped beams 20, 22 may be welded to the feet 30 of the I-beams. In some embodiments, the C-shaped beams 20, 22 do not extend outside of the opening 24 in the frame beam 12.

Figure 3:
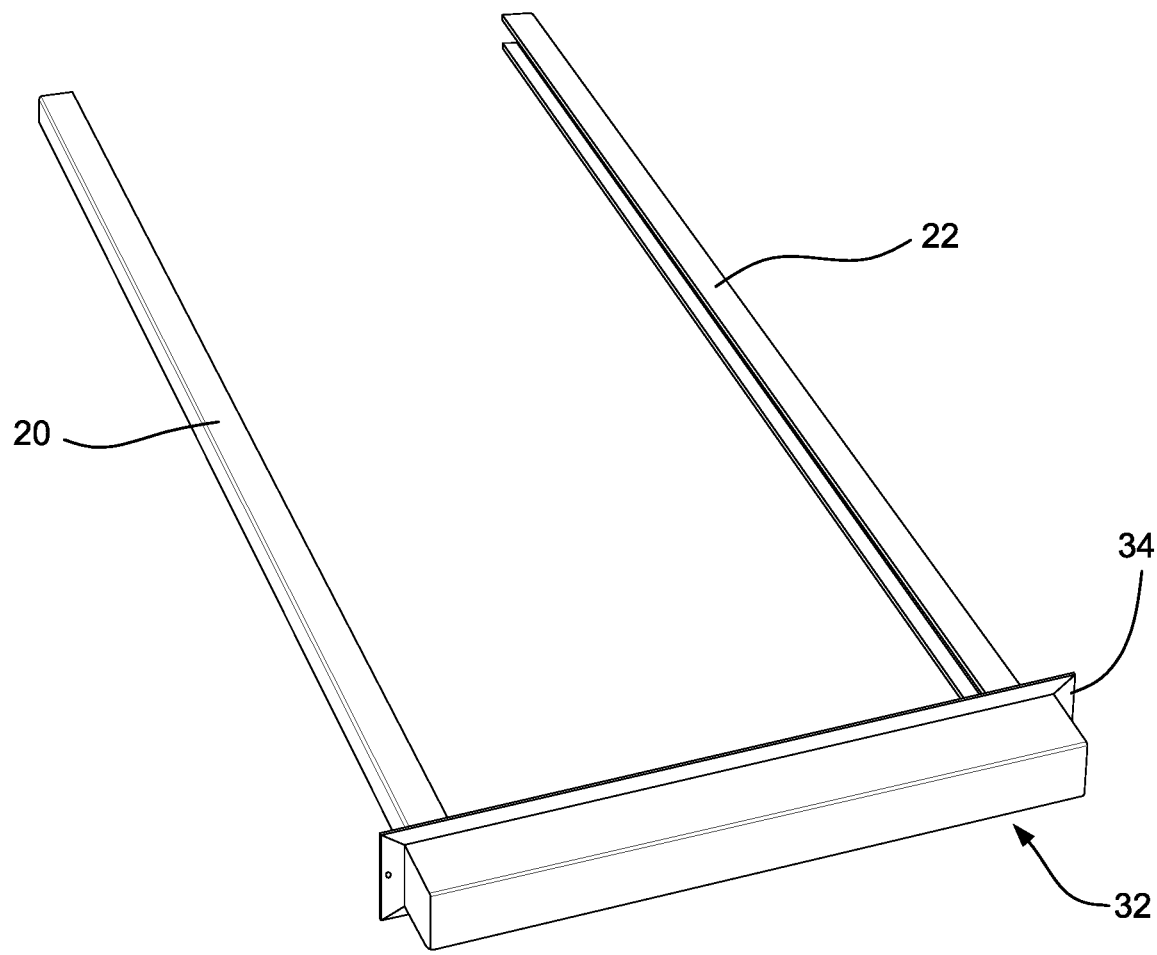
FIG. 3 shows a cover installed on the C-shaped beams of the storage compartment.

With reference to FIG. 3, a cover 32 may be removably installed onto the outside of the first and/or second frame beams 12, 14 to contain the table or other stored article in the storage compartment 18 during travel and to protect it from outside elements. In some embodiments, the cover 32 may be a rectangular shape with a predefined depth and flanges 34 for receiving screws to be removably installed on one or both of the first and second frame beams 12, 14.

Figure 4:
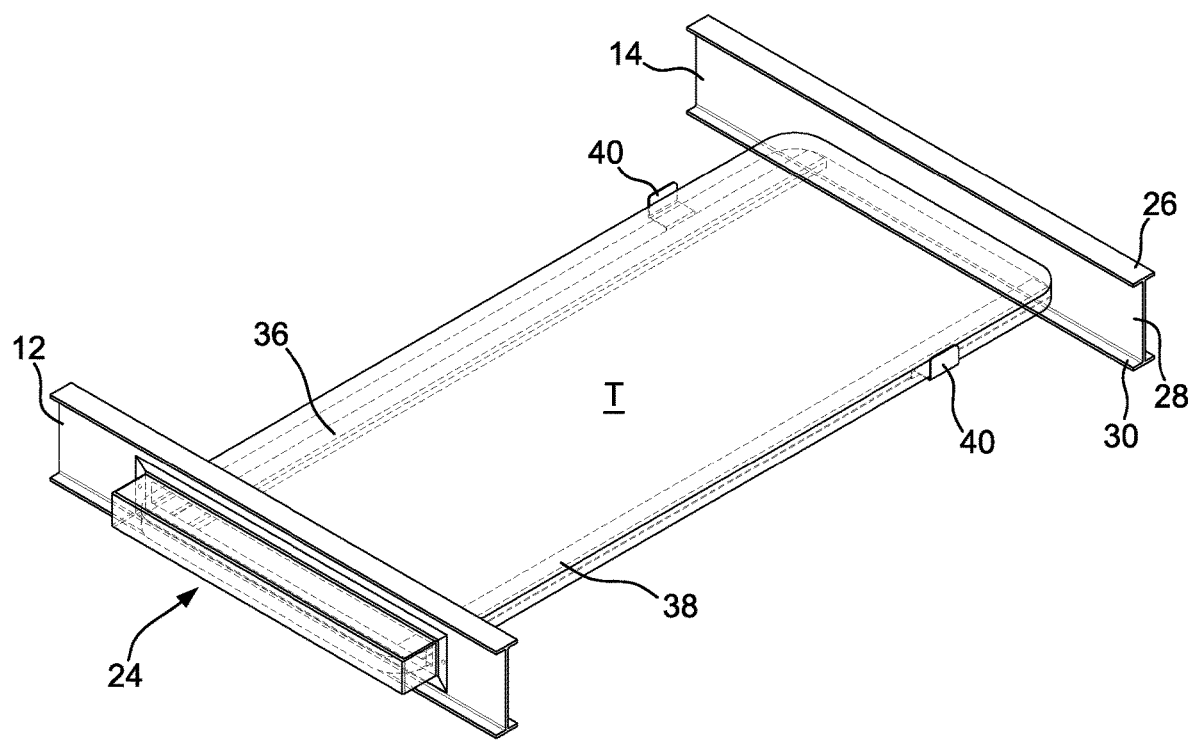
FIG. 4 shows an alternate embodiment of a trailer chassis storage compartment according to the described embodiments.

In another embodiment shown in FIG. 4, two tubes or beams 36, 38 may be mounted or welded to the I-beams 12, 14. In the embodiment shown, the beams 36, 38 are secured between the feet 30 of the I-beams 12, 14. Beams 36, 38 may respectively have a bracket or stopper 40 secured or welded to an outer side of the beams. The stoppers 40 may be located near an end of the beams 36, 38 furthest from the storage compartment opening 24. In other embodiments, the brackets/stoppers 40 may be secured near the midpoint of the beams 36, 38. The stoppers 40 may be located at any other suitable position on the beams 36, 38. This embodiment may include two or more brackets or stoppers 40 for guiding, containing, or holding the table T or other item for storage.

The storage compartment of the described embodiments provides a discreet and inexpensive solution for storing a folding table or the like on a trailer chassis. The table or other stored item can be readily accessed through one or two storage compartment openings through the frame beams. A cover secures the table or other stored article in the storage compartment and protects the table or stored article from outside elements.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A trailer chassis comprising:
a first frame beam;
a second frame beam parallel to and spaced from the first frame beam;
a plurality of cross members connected between the first frame beam and the second frame beam; and
a storage compartment cooperable with the first and second frame beams,
wherein the first and second frame beams are I-beams including a head, a body and foot, and
wherein the storage compartment is positioned between the head and the foot of the I-beams and through or adjacent to the body of at least one of the first and second frame beams.

2. A trailer chassis according to claim 1, wherein the storage compartment comprises a first C-shaped beam connected to and extending between the first and second frame beams and a second C-shaped beam connected to and extending between the first and second frame beams and spaced from the first C-shaped beam.

3. A trailer chassis according to claim 2, wherein open sides of the first and second C-shaped beams are disposed facing each other.

4. A trailer chassis according to claim 2, wherein the first and second C-shaped beams are welded to the first and second frame beams.

5. A trailer chassis according to claim 2, wherein the first frame beam comprises a first storage compartment opening, and wherein the first and second C-shaped beams are secured in the storage compartment opening.

6. A trailer chassis according to claim 5, wherein the second frame beam comprises a second storage compartment opening.

7. A trailer chassis according to claim 2, wherein a stored article is securable in openings of the first and second C-shaped beams, the trailer chassis further comprising a cover securable at an end of the stored article.

8. A trailer chassis according to claim 7, wherein the stored article is a folding table.

9. A trailer chassis according to claim 1, wherein the storage compartment comprises a first C-shaped beam connected to and extending between the bodies of the first and second frame beams and a second C-shaped beam connected to and extending between the bodies of the first and second frame beams and spaced from the first C-shaped beam.

10. A trailer chassis according to claim 9, wherein open sides of the first and second C-shaped beams are disposed facing each other.

11. A trailer chassis according to claim 9, wherein the first and second C-shaped beams are welded to the first and second frame beams.

12. A trailer chassis according to claim 9, wherein the first frame beam comprises a first storage compartment opening in the body of the first frame beam, and wherein the first and second C-shaped beams are secured in the storage compartment opening.

13. A trailer chassis comprising:
a first frame beam;
a second frame beam parallel to and spaced from the first frame beam;
a plurality of cross members connected between the first frame beam and the second frame beam; and
a storage compartment cooperable with the first and second frame beams, wherein the first frame beam comprises a storage compartment opening, the storage compartment including a first C-shaped beam connected or adjacent to and extending between the first and second frame beams and a second C-shaped beam connected or adjacent to and extending between the first and second frame beams and spaced from the first C-shaped beam, wherein open sides of the first and second C-shaped beams are disposed facing each other, wherein the first frame beam comprises a first storage compartment opening, and wherein the first and second C-shaped beams are secured in or adjacent to the storage compartment opening.

14. A trailer chassis according to claim 13, wherein the second frame beam comprises a second storage compartment opening.

15. A trailer chassis according to claim 13, wherein a stored article is securable in openings of the first and second C-shaped beams, the trailer chassis further comprising a cover securable at an end of the stored article.

16. A trailer chassis according to claim 15, wherein the stored article is a folding table.

17. A trailer chassis according to claim 13, wherein the first and second frame beams are I-beams.

18. A trailer chassis according to claim 13, wherein the first and second C-shaped beams extend through the storage compartment opening.

19. A trailer chassis comprising:
a first frame beam;
a second frame beam parallel to and spaced from the first frame beam;
a plurality of cross members connected between the first frame beam and the second frame beam; and
a storage compartment cooperable with the first and second frame beams,
wherein the first and second frame beams include a head, a body and foot, and
wherein the storage compartment is positioned between the head and the foot of the first and second frame beams and through or adjacent to the body of at least one of the first and second frame beams.

* * * * *